(12) United States Patent
King et al.

(10) Patent No.: US 7,911,337 B2
(45) Date of Patent: Mar. 22, 2011

(54) COMPASS BASED CAR LOCATOR

(75) Inventors: Ronald O. King, Brownstone, MI (US); Riad Ghabra, Dearborn Heights, MI (US); John Nantz, Brighton, MI (US); Yi Luo, Superior Township, MI (US)

(73) Assignee: Lear Corporation, Southfield, MI (US)

( * ) Notice: Subject to any disclaimer, the term of this patent is extended or adjusted under 35 U.S.C. 154(b) by 266 days.

(21) Appl. No.: 12/044,863

(22) Filed: Mar. 7, 2008

(65) Prior Publication Data

US 2009/0224946 A1 Sep. 10, 2009

(51) Int. Cl.
*G08B 1/08* (2006.01)

(52) U.S. Cl. .............. 340/539.21; 340/988; 340/989; 340/539.13; 340/426.22; 340/539.11; 701/200; 701/213

(58) Field of Classification Search ........... 340/426.19–426.36, 539.11–539.21, 340/988–990, 932.2; 701/200–213, 302; 342/357.07, 457; 33/352

See application file for complete search history.

(56) References Cited

U.S. PATENT DOCUMENTS

| | | | | |
|---|---|---|---|---|
| 6,363,324 B1 * | 3/2002 | Hildebrant | | 701/213 |
| 6,405,125 B1 * | 6/2002 | Ayed | | 701/200 |
| 6,529,142 B2 * | 3/2003 | Yeh et al. | | 340/988 |
| 7,148,802 B2 * | 12/2006 | Abbruscato | | 340/539.13 |
| 7,242,321 B2 * | 7/2007 | New et al. | | 340/988 |
| 2003/0139878 A1 * | 7/2003 | DeLuca et al. | | 701/213 |
| 2006/0042107 A1 | 3/2006 | Ligai | | |
| 2006/0149684 A1 * | 7/2006 | Matsuura et al. | | 705/65 |

FOREIGN PATENT DOCUMENTS

| | | |
|---|---|---|
| DE | 10046571 A1 | 5/2002 |
| DE | 10235132 A1 | 2/2004 |
| DE | 102004050292 A1 | 4/2006 |
| DE | 102005003452 A1 | 7/2006 |
| DE | 60027742 T2 | 11/2006 |

OTHER PUBLICATIONS

German Office Action for corresponding Application No. 10 2009 006 796.5, mailed Jul. 13, 2010, 8 pages.

* cited by examiner

*Primary Examiner* — Brent Swarthout
(74) *Attorney, Agent, or Firm* — Brooks Kushman P.C.

(57) ABSTRACT

A remote keyless entry system is provided comprising a handheld remote keyless entry transmitter in selectable wireless communication with a car based entry system. The handheld remote keyless entry transmitter comprises an integrated electronic compass element and logic adapted to store a first compass direction when activated and directed towards a destination. The logic further is adapted to display a return compass direction and a return distance from the car based entry system when activated leaving the destination.

15 Claims, 2 Drawing Sheets

COMPASS BASED CAR LOCATOR

TECHNICAL FIELD

The present invention relates generally to a system and assembly for locating a parked vehicle, and more particularly concerns a compass based location system with distance display.

BACKGROUND

Vehicle location technology has made significant advances. Customers routinely rely on global positioning systems (GPS) for in-car navigation and increasingly for finding locations of destinations. Despite the increased use of GPS technologies, it cannot address all of the vehicle location needs. One such need wherein GPS technology falls short is the locating of a parked vehicle from a remote location.

Virtually every car user has encountered this dilemma. At a mall, an airport parking lot, a concert, or even work, when a driver attempts to return to the vehicle the precise location cannot be remembered. Handheld GPS devices would provide an incredibly accurate and convenient methodology for locating the parked vehicle. At present, however, GPS technologies have drawbacks that render them undesirable especially to integration into portable key-fobs. GPS technology is often very expensive and as such may not be considered cost effective. Furthermore, present GPS designs often require a significant amount of PCB space which results in an oversized transmitter. In addition, GPS technologies require significant current which prevent their integration into standard key-fobs.

It would be advantageous to have a cost effective and simple vehicle location device that could be integrated into existing remote keyless entry systems. It would be further advantageous for such a system to be small, cost effective, and capable of sharing a key-fob with a remote keyless entry transmitter.

SUMMARY OF THE INVENTION

A remote keyless entry system is provided comprising a handheld remote keyless entry transmitter in selectable wireless communication with a car based entry system. The handheld remote keyless entry transmitter comprises an integrated electronic compass element and logic adapted to store a first compass direction when activated and directed towards a destination. The logic further is adapted to display a return compass direction and a return distance from the car based entry system when activated leaving the destination.

The present invention itself together with further intended advantages, will be best understood by reference to the following detailed description and taken in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION

In the following description, various operating parameters and components are described for one or more constructed embodiments. These specific parameters and components are included as examples and are not meant to be limiting.

Figure 1:
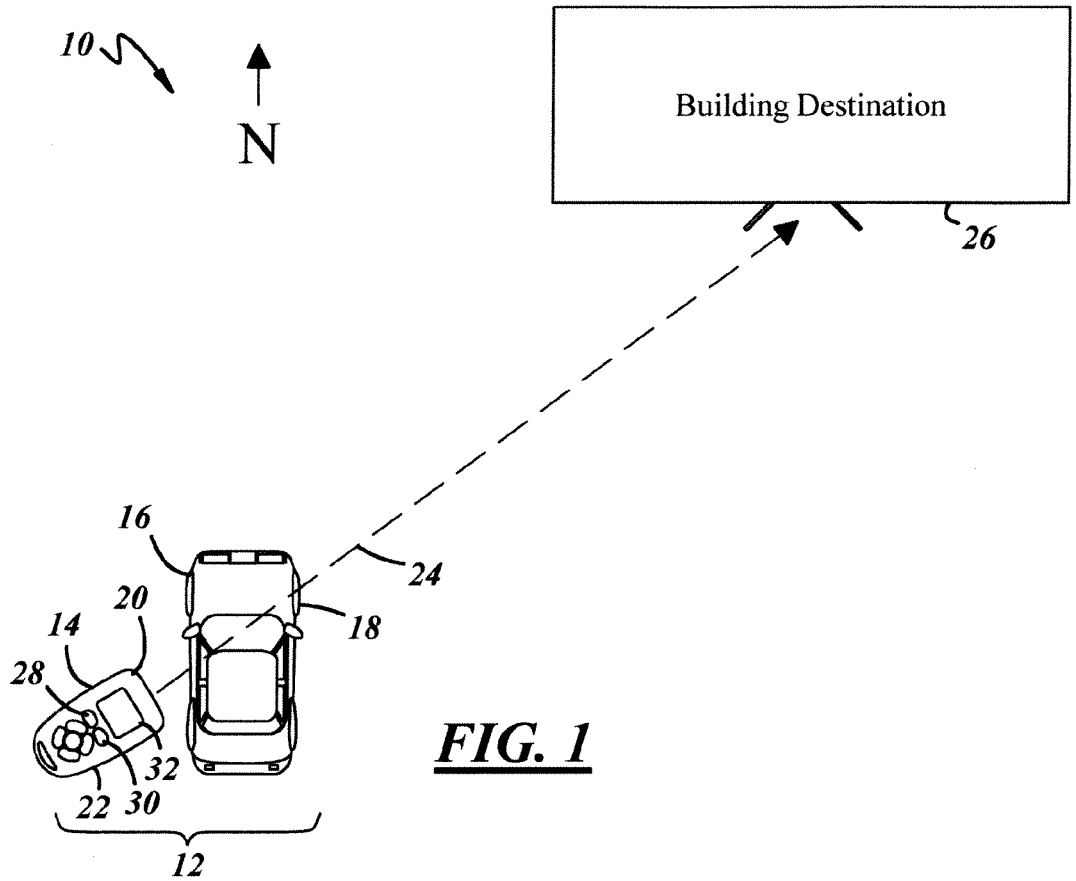
FIG. 1 shows a vehicle location system in accordance with the present invention, the system illustrated setting a first compass direction.
Figure 2:
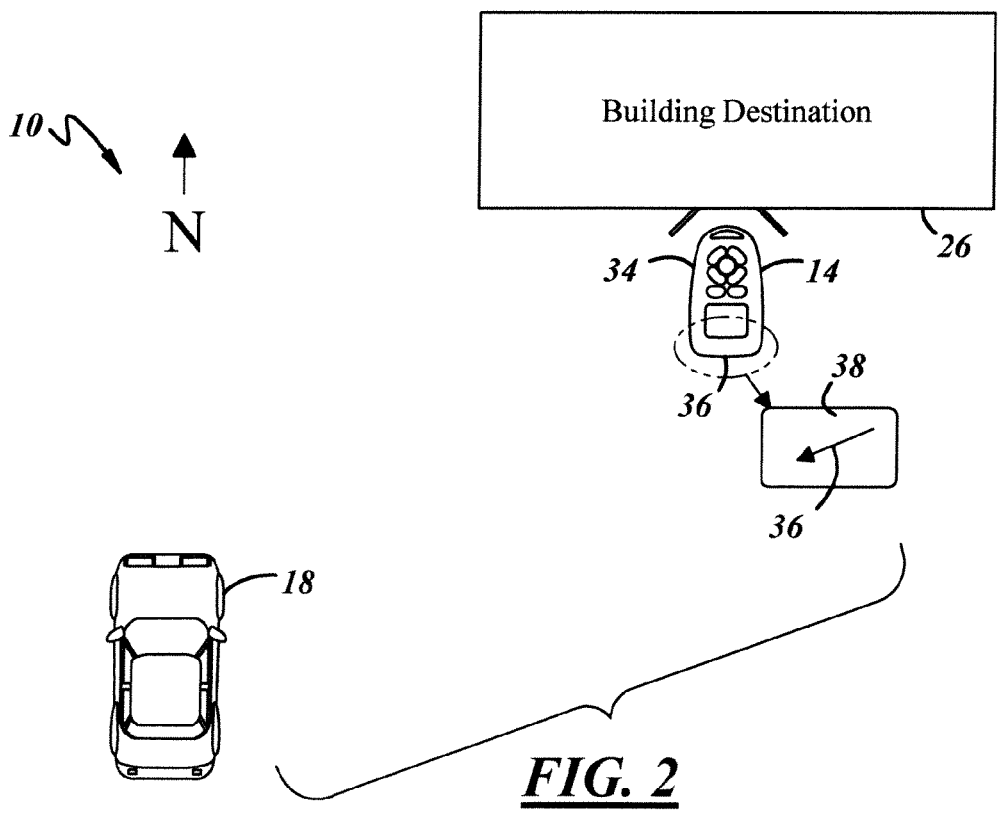
FIG. 2 shows the vehicle location system illustrated in FIG. 1, the system illustrated displaying the return direction and return distance to the vehicle.

Referring now to FIGS. 1 and 2, which is a vehicle location system 10 in accordance with the present invention. Although it is contemplated that the vehicle location system 10 may be an independent stand alone system, it is preferable that the vehicle location system 10 be incorporated into an existing vehicle system such as a remote keyless entry system 12.

The vehicle location system 10 includes a handheld remote 14 (handheld remote keyless entry transmitter) in selective wireless communication with a signal generating car based system 16 (car based entry system). These systems are well known in the art and by consumers to remotely lock and unlock their vehicle 18. The present invention differs from existing remote keyless entry systems 12 by integrating a compass element 20 into the handheld remote keyless entry transmitter 14. It is contemplated that this compass element 20 comprise an electronic compass element and is preferably self leveling such that it provides an accurate directional reading over a variety of angles of the transmitter 14. It is further preferable that the compass element 20 be driven by the same power source 22 (battery) as the remote keyless entry transmitter 14.

The handheld remote keyless entry transmitter 14 further comprises logic adapted to store a first compass direction 24 when activated and directed towards a destination 26. This may be accomplished by a user pressing a dedicated directional lock button 28 or may simply be done automatically upon a user pressing the vehicle lock button 30. In either case, the first compass direction 24 is stored within the logic and may be displayed accordingly on a display screen 32. The user is then free to proceed to the destination and enter thereto.

At some point the user will desire to leave the destination 26 and proceed back to the vehicle 18. If significant time has passed, the user may not recall the location of the vehicle 18 which may well be out of eye shot. As such the user may activate the handheld remote keyless entry transmitter 14 upon leaving the destination 26, preferably by way of pressing a return to vehicle button 34. The logic is then further adapted to calculate and display a return compass direction 36 and a return distance 38 to the vehicle 18 to help guide the user back to the vehicle 18. It is contemplated that the return distance 38 may be calculated in a variety of fashions. In one embodiment, it is contemplated that the return distance 38 is determined using the signal strength of the car based entry system 16. In another embodiment to be further redressed below, it is contemplated that a pedometer count, travel time, or other methodology be utilized to estimate the distance between the vehicle 18 and the destination 26. By providing both direction and distance, the present invention provides the user with a quick, inexpensive, and portable estimation of the vehicle 18 location when leaving a destination 26.

Figure 3:
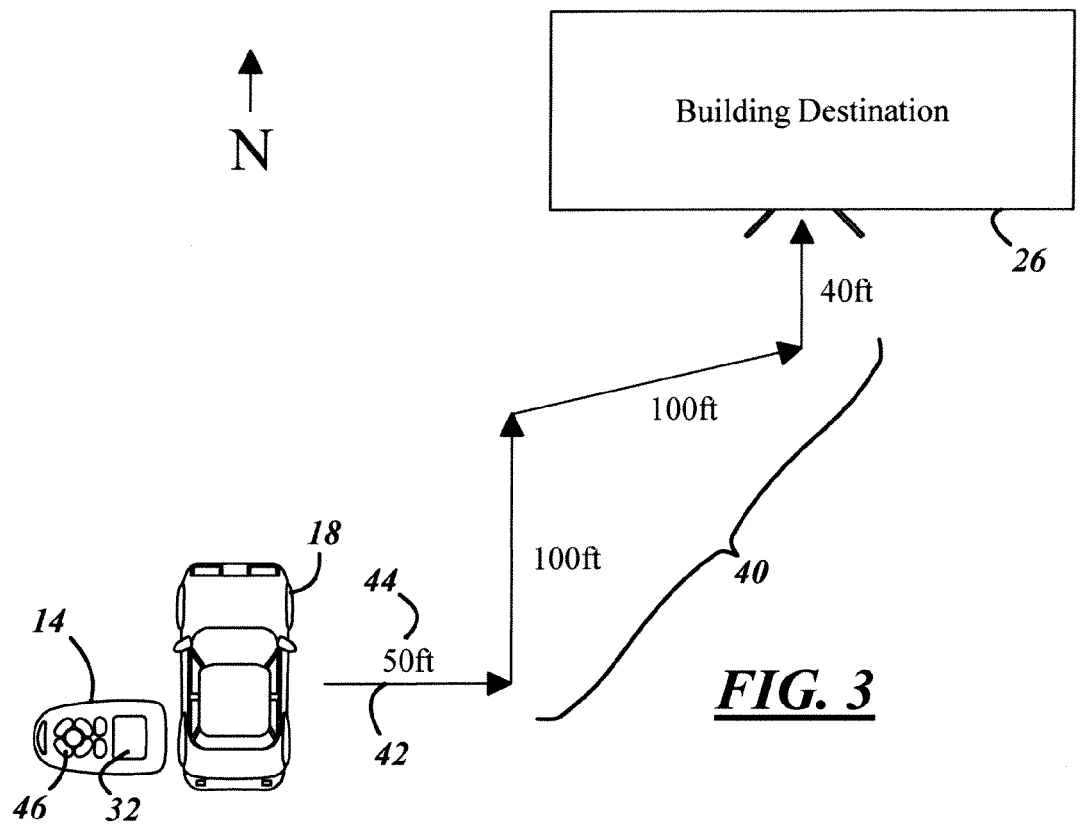
FIG. 3 shows an alternate embodiment of the vehicle location system illustrated in FIG. 1, the system illustrated storing a plurality of journey segments.
Figure 4:
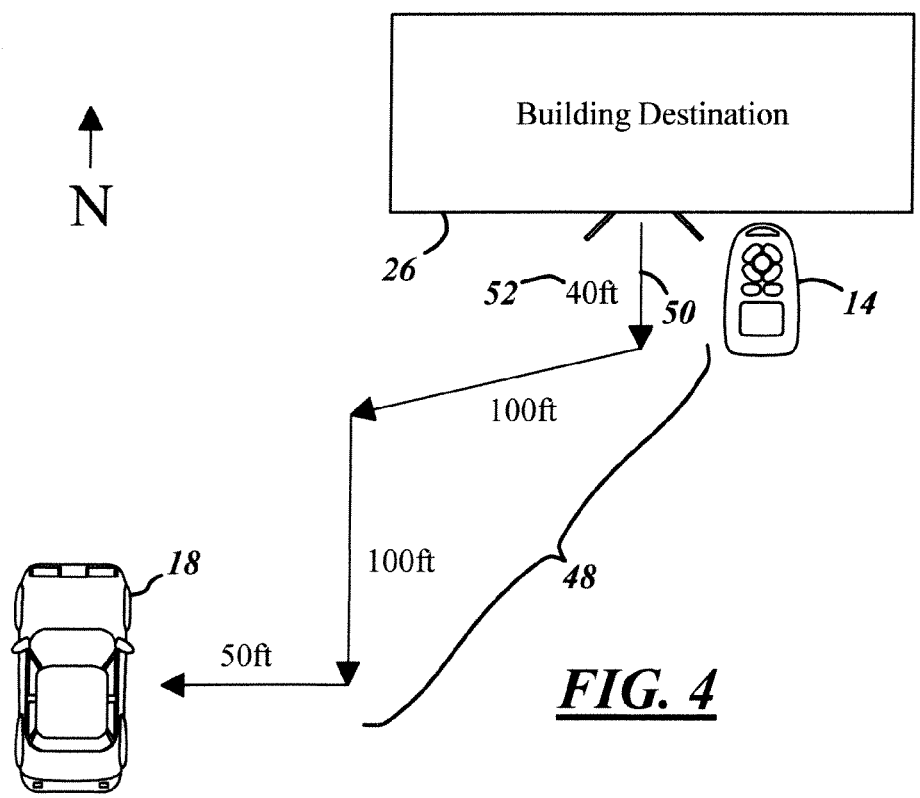
FIG. 4 shows the vehicle location system illustrated in FIG. 3, the system illustrated showing a segmented return trip information.

It should be understood, that the aforementioned vehicle location system 10 as described is described at its most basic, wherein the user can reasonably point the handheld remote keyless entry transmitter 14 at an identifiable destination 26. There may be scenarios, however, where the user's path to the destination 26 is convoluted and the destination 26 may not be immediately visible from the vehicle 18 (see FIGS. 3 and 4). The present invention, therefore, further contemplates that the logic may be further adapted to store a plurality of journey segments 40 rather than simply a single destination. This is accomplished by storing for each of the plurality of journal segments 40, a step compass direction 42, and a step distance 44 from the vehicle 18 or the car based entry system 16. This may be accomplished by the user pressing the directional lock button 28 and the end of each directional segment 40 or by the logic recognizing a significant alteration or directional travel and automatically instituting a segment change. The logic may alternatively use a timed polling to define the segments. Similarly, distance may again be gauged by signal strength from the car based entry system 16, by pedometer count, or by any other method.

It is contemplated that the user may press a final destination button 46 at the end of the journey segments 40 or that the logic may continuously map directions and distances. In either case, the logic is adapted to calculate and display a return trip 48 comprising a plurality of step return compass directions 50 and step return distances 52. These may be displayed sequentially as the user returns to the vehicle 18 or may be displayed all at once such that the user can map his return path differently. Finally, it is contemplated that the logic may be further adapted to continuously monitor the user's return to the vehicle 18 such that distance and direction may be continually adjusted if alternate paths are utilized.

While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. A remote keyless entry system comprising:
    a handheld remote keyless entry transmitter in selectable wireless communication with a car based entry system, said handheld remote keyless entry transmitter comprising:
    an integrated electronic compass element; and
    logic adapted to:
        store a first compass direction when activated and directed towards a destination;
        display a return compass direction when activated leaving said destination;
        display a return distance from said car based entry system;
        wherein said return distance is based on signal strength from said car based entry system;
    store a plurality of journey segments, each journey segment comprising:
        a stored step compass direction, and
        a stored step distance from said car based entry system; and
    calculate a return trip comprising for each journey segment:
        a step return compass direction; and
        a step return distance; and
    display sequentially each journey segment when leaving said destination.
2. The remote keyless entry system according to claim 1, wherein said signal strength from said car based entry system is determined from signals exchanged between said handheld remote keyless entry transmitter and said car based entry system.
3. The remote keyless entry system according to claim 1, wherein said first compass direction is stored upon activating door locks.
4. The remote keyless entry system according to claim 1, wherein said return distance is adjusted based on a pedometer count.
5. The remote keyless entry system according to claim 1, wherein said integrated electronic compass element comprises a self leveling electronic compass.
6. The remote keyless entry system according to claim 1, wherein said return compass direction comprises a reverse of said first compass direction.
7. A vehicle location system comprising:
    a handheld remote comprising:
        an integrated compass element; and
        logic adapted to:
            store a first compass direction when activated and directed towards a destination;
            calculate and display a return compass direction and a return distance to the vehicle when activated leaving said destination; and
        wherein said logic is further adapted to:
        store a plurality of journey segments, each journey segment comprising:
        a stored step compass direction; and
        a stored step distance; and
        calculate and display a return trip comprising for each journey segment;
        a step reverse compass direction; and
        a step reverse distance.
8. A vehicle location system as described in claim 7, wherein said integrated compass element comprises an electric compass.
9. A vehicle location system as described in claim 7, wherein said return distance is based on the strength of a signal emanating from the vehicle.
10. A vehicle location system as described in claim 7, wherein said return distance is based on a pedometer count.
11. A vehicle location system as described in claim 7, wherein said integrated compass element comprises a self leveling compass.
12. A method of locating a parked vehicle comprising:
    storing a first compass direction of an integrated electronic compass element positioned within a handheld remote keyless entry transmitter within a memory of the handheld remote keyless entry transmitter, the first compass direction being stored upon said handheld remote keyless entry transmitter being activated when directed towards a destination, said handheld remote keyless entry transmitter in selectable wireless communication with a car based entry system;
    the handheld remote keyless entry transmitter calculating and displaying a return compass direction and return distance from said car based entry system upon said handheld remote keyless entry transmitter being activated when leaving said destination;
    wherein the handheld remote keyless entry transmitter calculates said return distance based on a pedometer count of a pedometer positioned within the handheld remote keyless entry transmitter;
    storing a plurality of journey segments, each journey segment comprising:
        a stored step compass direction; and
        a stored step distance; and calculating and displaying a return trip comprising for each journey segment:
a step reverse compass direction; and
a step reverse distance.

13. A method as described in claim 12, wherein said return distance is adjusted based on signal strength from said car based entry system.

14. A method as described in claim 12, wherein said integrated electronic compass element comprises a self leveling electronic compass.

15. A method as described in claim 12, wherein said first compass direction is stored upon activating door locks.

* * * * *